(12) United States Patent
Loh et al.

(10) Patent No.: US 8,610,538 B2
(45) Date of Patent: Dec. 17, 2013

(54) MEMORY-TAG DATA AUTHENTICATION

(75) Inventors: Weng Wah Loh, Bristol (GB); Fraser John Dickin, Bristol (GB); Thomas Rathbone, Wolverhampton (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1727 days.

(21) Appl. No.: 11/359,458

(22) Filed: Feb. 23, 2006

(65) Prior Publication Data

US 2006/0208903 A1 Sep. 21, 2006

(30) Foreign Application Priority Data

Feb. 23, 2005 (GB) .................................. 0503675.1

(51) Int. Cl.
*G08B 21/00* (2006.01)
(52) U.S. Cl.
USPC ... 340/5.61; 340/10.34; 340/5.26; 340/572.1; 235/492; 380/270; 380/278
(58) Field of Classification Search
USPC ............ 340/5.61, 10.51, 10.52, 572.1–572.9, 340/5.26, 10.34; 235/492; 380/270, 278
See application file for complete search history.

(56) References Cited

U.S. PATENT DOCUMENTS

| 5,832,090 A * | 11/1998 | Raspotnik ....................... 705/66 |
| 6,323,566 B1 * | 11/2001 | Meier .......................... 307/10.2 |
| 7,091,864 B2 * | 8/2006 | Veitch et al. ................ 340/572.8 |
| 7,221,258 B2 * | 5/2007 | Lane et al. .................... 340/10.1 |
| 2004/0181681 A1 | 9/2004 | Salisbury |
| 2006/0061482 A1 * | 3/2006 | Monney et al. .......... 340/825.52 |

FOREIGN PATENT DOCUMENTS

| WO | WO 94/26043 | 11/1994 |
| WO | WO 02/01328 | 1/2002 |
| WO | WO 03/081934 | 10/2003 |
| WO | WO 2004/034321 | 4/2004 |

OTHER PUBLICATIONS

Dallas Semiconductor Maxim White Paper 8: 1-Wire SHA-1 Overview, Sep. 10, 2002, 12 pgs.

* cited by examiner

*Primary Examiner* — Mohammad Ghayour
*Assistant Examiner* — Mark Rushing

(57) ABSTRACT

A memory tag comprises an array of non-volatile memory, means for inductively obtaining power to enable receipt of data from and transmission of data to a reader device, a processor operable to process received data and to generate data to be transmitted; and a hash co-processor configured to apply a hash function to data applied to it. The array of non-volatile memory includes an area of write only memory. Reader devices for use with such memory tags and methods of using such memory tags are also described.

5 Claims, 3 Drawing Sheets

MEMORY-TAG DATA AUTHENTICATION

FIELD OF THE INVENTION

This invention relates to memory tags. More particularly, this invention relates to a secure architecture for memory tags and methods for authenticating the source of memory tags and the data stored thereon.

BACKGROUND OF THE INVENTION

Radio frequency identification (RFID) tags are well known in the prior art. RFID tags come in many forms but all comprise an integrated circuit on which, in use, data can be stored and a coil which enables it to be interrogated by a reader that also powers it by means of an inductive (wireless) link. Generally RFID tags are quite large, due to the frequency they operate at (13.56 $MH_z$) and the size of coil they thus require, and operate over large ranges and have very small storage capacity. Smaller RFID tags have also been developed, operating at various frequencies, but still having small storage capacity. Some RFID tags include read-only memory (ROM) and are written to at the time of manufacture, whilst others have read and write capability.

A memory tag may generally be considered to be a transponder device with significant memory—sufficient to store significant digital content rather than just identifier data. A memory tag is thus generally more sophisticated than a conventional RFID tag (containing typically a short piece of data primarily useful to provide an identifier alone), and may incorporate a number of elements. A particularly useful form of memory tag operates inductively by provision of RF power in a similar manner to an RFID tag. Such memory tags may include an antenna which couples inductively with an antenna in a tag reader, an RF decoder for decoding radio frequency signals received via the antenna, logic for processing the received signal and an area of non-volatile memory. Memory tags may also include an RF coder for coding data to be transmitted from the tag to the reader.

Data stored in memory tags is accessible by a reader device, which powers up the tag and causes stored information to be output. Any person with access to a reader may access this information by bringing that reader into close proximity with the memory tag whether or not they are authorised to do so even when the data that is stored is of a sensitive or confidential nature. Further, any person with access to a memory tag write device, such as a memory tag reader with write capability, may access and change the information stored on a memory tag, or may copy the information stored on one memory tag onto another tag, thereby providing a duplicate memory tag.

An issuer of memory tags seeking a high level of confidence of the authenticity of the identity of the tags that are presented to it (for example, enabling an establishment that issues memory tags to members as entry access devices to have a high degree of certainty that tags presented to it for access to the establishment are tags issued by the establishment) may manufacture and provide to that establishment memory tags having an architecture that are unique to that establishment.

SUMMARY OF THE INVENTION

In accordance with a first aspect of the invention, a memory tag comprises an array of non-volatile memory, means for inductively obtaining power to enable receipt of data from and transmission of data to a reader device, a processor operable to process received data and to generate data to be transmitted, and a hash co-processor configured to apply a hash function to data applied to it, wherein the array of non-volatile memory includes an area of write-only memory.

BRIEF DESCRIPTION OF THE DRAWINGS

Specific embodiments of the present invention are now described by way of example only, with reference to the accompanying drawings in which:

FIG. 1b(ii) is a data packet structure for use in authenticating a memory tag according to embodiments of the invention;

DETAILED DESCRIPTION

As will be described below, in aspects embodiments of the present invention provides for memory tag architecture that enables the provision of a high confidence of the identity of the tag and allows authentication of that memory tag. A basic architecture will first be described, followed by a description of specific embodiments.

Figure 1:
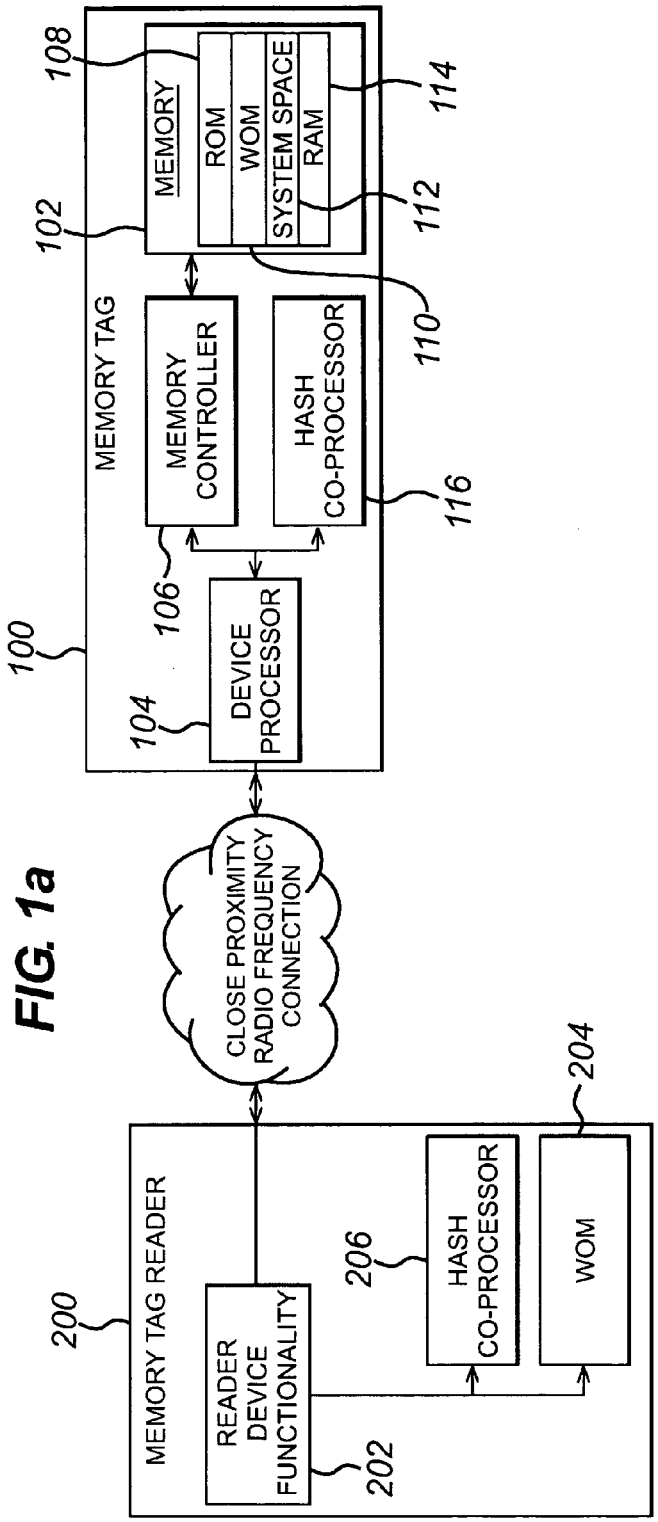
FIG. 1a is a schematic of a memory tag and a memory tag reader according to embodiments of the invention.
FIG. 1b(i) is a prior art data packet structure.

FIG. 1a shows schematically a memory tag reader and a memory tag according to embodiments of the present invention. Digressing briefly, the basic operation of a memory tag and reader device will now be described. A memory tag, such as a memory tag 100, includes an antenna coil and a capacitor connected in parallel with it to form a resonant circuit. It further includes a memory 102, a device processor 104 and optionally a discrete memory controller 106. Similarly, a memory tag reader device 200 includes an antenna coil and capacitor in parallel therewith to form a resonant circuit, and a device processor, grouped together in FIG. 1 as reader device functionality 202.

A signal generator within reader device functionality 202 generates a signal at a chosen frequency of operation of the tag 100, such as 2.45 $GH_z$ which is applied to the antenna coil within the reader device functionality 202 and thus generates an electromagnetic field which, provided the memory tag 100 is sufficiently close to the reader device 102, penetrates the antenna coil of the memory tag 100. By induction, a voltage is thus generated in the antenna coil of the memory tag 100, which is rectified in the device processor 104 and is used to power the memory tag 100.

When data stored in the memory tag 100 is to be read by the reader 200, the reader 200 is brought into close proximity with the tag 100, thus causing it to power up as discussed above. The device processor 104 applies a signal indicative of, for example, the data stored in the memory to the antenna coil of the memory tag 100 which is detected, as a result of the inductive coupling, by the antenna coil within the reader device functionality 202 and which is deciphered in the reader device processor before being passed from the reader device 200 to a main processor of the reading apparatus. This signal may, for example, be transmitted using load modulation. In RFID systems such as this, the power consumed by the memory tag 100 can be measured as a drop in voltage across the internal resistance of the antenna coil of the reader device 200.

A key feature of the memory tags preferably employed in embodiments of this invention is their size. Each memory tag preferably has a footprint of approximately 2 mm² in size and has a capacity of approximately 1 Mbit or more. Input and output to the memory device is via close range coupling. In this sense, close range means less than 20 millimeters—in embodiments, approximately 3 to 4 millimeters or less, or more preferably 1.5 millimeters. Of course, memory tags having other dimensions, capacities and ranges may equally be used in embodiments of the present invention as may tags that operate outside the RF frequency band.

Data may also be written to the memory tag 100 using the reader device 200, which may also therefore be a write device. When data is to be written to the memory tag 100 the radio frequency signal generated in the reader device functionality is modulated, e.g. amplitude modulated, with the data to be written before it is applied to the antenna coil of the memory tag reader device 200 and transmitted. The signal received by the memory tag 100, by inductive coupling, thus both powers the memory tag 100 and communicates with it. The memory tag device processor 104 separates the data signal from the carrier signal and passes data for storage to the memory 102 via the memory controller 106.

As already noted, the memory 102 within the memory tag 100 is non-volatile memory. This may be selected, entirely or in part, from ferro electric random access memory (FRAM), FLASH memory, or read-only memory (ROM) for example.

Returning to the present embodiment of the invention, it will be seen that the memory tag 100 incorporates a number of additional elements. Firstly, the memory 102 of the memory tag is sub-divided into a number of memory types. These are as follows in the preferred embodiment. There is an area of read-only memory (ROM) 108, an area of write-only memory (WOM) 110, an area of system space 112 and an area of random access memory (RAM) 114. Each area of the memory 102 is controlled, in the preferred embodiment, by the memory controller 106 under the control of the device processor 104. The memory tag 100 of embodiments of the present invention also incorporates a hash co-processor 116.

The read-only memory 108 is a portion of memory which may, for example, be a single memory location, in which a global unique identification (GUID) that is assigned to the memory tag is stored. This global unique identification (GUID) is generally assigned to a tag upon manufacturing, that is it is stored in the ROM 108 when a tag is made. Alternatively, the global unique identification (GUID) may be written into the ROM 108 by the person/establishment, etc, issuing the tags prior to issuance. The area of ROM will then be locked such that it may no longer be modified.

The write-only memory 110 is an area of memory that is locked for the purposes of reading. This, for example, may consist of memory areas 1 to 32 (when the global unique identification is stored between memory addresses 0 and 1). This memory may only be written to by a write enabled reader device 200 accessing the memory tag. It may not be read. Should a memory tag reader device, such as device 200, attempt to read the memory addresses within the write-only section of memory 102, an erroneous response such as "0000" will be returned. The information stored at the memory addresses in question will not be provided to the reader device. Of course, the device processor 104 of the memory tag 100 is able to read the contents of the write-only memory 110 within the memory tag 100.

The system space 112 within the memory 102 is a portion of the memory 102 for use by the memory tag 100 itself in carrying out its operations. Finally, the random access memory 114 is an area of general storage within the memory tag. This area of the memory is utilised to store data on the memory tag, the purpose of memory tags, and is accessible by the reader device 200 for both reading and writing as required. Of course, this area of the memory tag memory 102 need not be non-volatile RAM. As already noted, it may consist of non-volatile FLASH MEMORY or ROM.

The hash co-processor is a module within the memory tag 100 data stream which receives, via the device processor 104 and/or memory controller 106, a variable length input and performs a hash function upon that input. The output of the hash co-processor is therefore a fixed size bit stream known as a digest. Any cryptographically secure hash function may be used in the hash co-processor 116 of embodiments of the present invention. For example, the hash functions MD5 or SHA1 may be utilised. However, in the preferred embodiment, an optimised version of SHA1 is run by hash co-processor 116. The SHA1 hash function is a secure hash function which receives a variable size stream of data (i.e. bytes) and produces a 160 bit digest in response to whatever data stream is supplied to it. Moreover, SHA1 is a one-way hash function, i.e. it is not possible to look at the digest produced by SHA1 and work backwards to find the data which was input to the function to produce the digest. SHA1 is particularly secure. It cannot be run backwards even to guess the last two or three digits of the input data sequence.

In its full implementation, $2^{64}$ bits of data can be input to the SHA1 function before the digest produced by the function starts to repeat. SHA1 splits received data into blocks and processes one block at a time in order to produce the digest. However, in the optimised version which is preferably used in the hash co-processor 116 of embodiments of the present invention, only one block, of 480 bits for example, is provided to the co-processor. This reduces significantly the time taken and power utilised to produce the digest.

It can be seen from FIG. 1a that the memory tag reader 200 also incorporates an area of write-only memory 204 and a hash co-processor 206. These elements have the same characteristics and operate in the same fashion as their counterparts in the memory tag 100. For example, the hash co-processor 206 will always employ the same hash function as the co-processor 116 in the memory tag. In fact, the hash co-processor 206 and the write-only memory 204 provided in the memory tag reader 200 may be provided in the form of a memory tag 100 operating as a co-processor within the reader device 200. However, in alternative memory tag reader devices there may be provided only the hash co-processor and write-only memory in addition to usual reader device functionality. All other functions may be provided through the reader device processor for example. This will prevent the presence of elements of a memory tag that are redundant when utilised as a co-processor in the memory tag reader 200.

The way in which the additional functionality described above with reference to FIG. 1a operates to provide a high confidence of the identity of a memory tag that is being read will now be discussed. Firstly, referring to FIG. 1b, both a prior art data packet and a data packet utilised in authenticating a memory tag, for example, according to embodiments of the present invention, are shown. FIG. 1b(i) shows a data packet which incorporates two synchronisation fields followed by a command field, an address field, a length field, a cyclic redundancy check field and a data field. In such a data packet, the command field will be populated with either a read or a write command. This packet structure may be used when performing a read or a write operation on a memory tag using a memory tag reader device, with write capability as necessary. However, a further command is required in order to enable an "authentication function" to be carried out. Accordingly, a data packet as shown in FIG. 1b(ii) is required. Similarly to the prior art data packet, this data packet 300 incorporates two synchronisation data fields 302 and 304. These are followed by a command field 306. The command field may be populated with either a read command, a write command or an authenticate command. Where the command field is populated with an authenticate command, the next field in the data packet is a key address 308. This indicates the address at which key sequence data (as will be discussed in more detail below) commences within the write-only memory area 110 of the memory tag 100. The key address field is followed by a random data length field 310, which specifies the length of the random data that will follow. Finally, a random data field is included in the data packet. The data in this field must be random as will be described later. The random data field is numbered 312 in FIG. 1b(ii).

In one embodiment of the invention, the data packet which enables authentication omits a cyclic redundancy check-check sum data field. In this embodiment, the memory tag can be scanned many times by the memory tag reader device 200. However, in an alternative embodiment, a cyclic redundancy check data field may be included in the data packet. In this case, the memory tag reader will know, by virtue of the use of cyclic redundancy checking as is known in the art, that the packet was sent and received correctly, and the memory tag need only be scanned once by the memory tag reader 200. Hence, if the data returned to the reader device 200 from the memory tag 100 is incorrect, it is known as will be discussed below, without the need for further scans of the memory tag 100, that the memory tag 100 is not authentic.

The use of the architecture set forth in and with respect to FIG. 1 will now be described with reference to FIG. 2, and utilising the example of a museum entry access system. A museum wishing to utilise memory tags to enable its patrons to gain access a given number of times will purchase, for example, a number of blank memory tags according to embodiments of the invention. As already discussed, these memory tags may have a global unique identification pre-assigned in the read-only memory area of the memory tag. Alternatively, the read-only memory area will be unlocked at delivery and blank to enable the museum to insert its own global unique identifier in the memory tags and to lock the read-only memory area once this is done. In a preferred embodiment, the global unique ID may be 1024 bits long.

In order for the entry access system to be effective, the museum must have what may be termed a "clean room" in which is located a memory tag read and write device 200. This device is the device utilised to issue key sequences to memory tags, i.e. to write a selected piece of data into the write-only memory area of each tag that is to be issued for use as a museum access device. The clean room is a room that is completely secure. Only authorised personnel are able to obtain access to that room and therefore only authorised personnel will know the key that is stored in the write-only memory area of issued memory tags.

The museum takes the blank tags which are purchased and, utilising the read and write device 200 within the clean room, writes one or more key sequences into the write-only memory area of these memory tags. Each tag is preferably provided with WOM sized to accommodate 2*16*240 bit key sequences, as are the reader devices. The memory tags are also configured to allow a predetermined number of accesses to the museum. The museum then issues these memory tags to museum patrons. When a patron wishes to gain access to the museum, for example, the memory tag is brought into close proximity to a memory tag reader device 200 that is present in the museum entry portal. Bringing the tag into close proximity causes it to be powered up and to interact with the reader as discussed above. Upon authentication of the tag and the data within the tag, access is granted.

Figure 2:
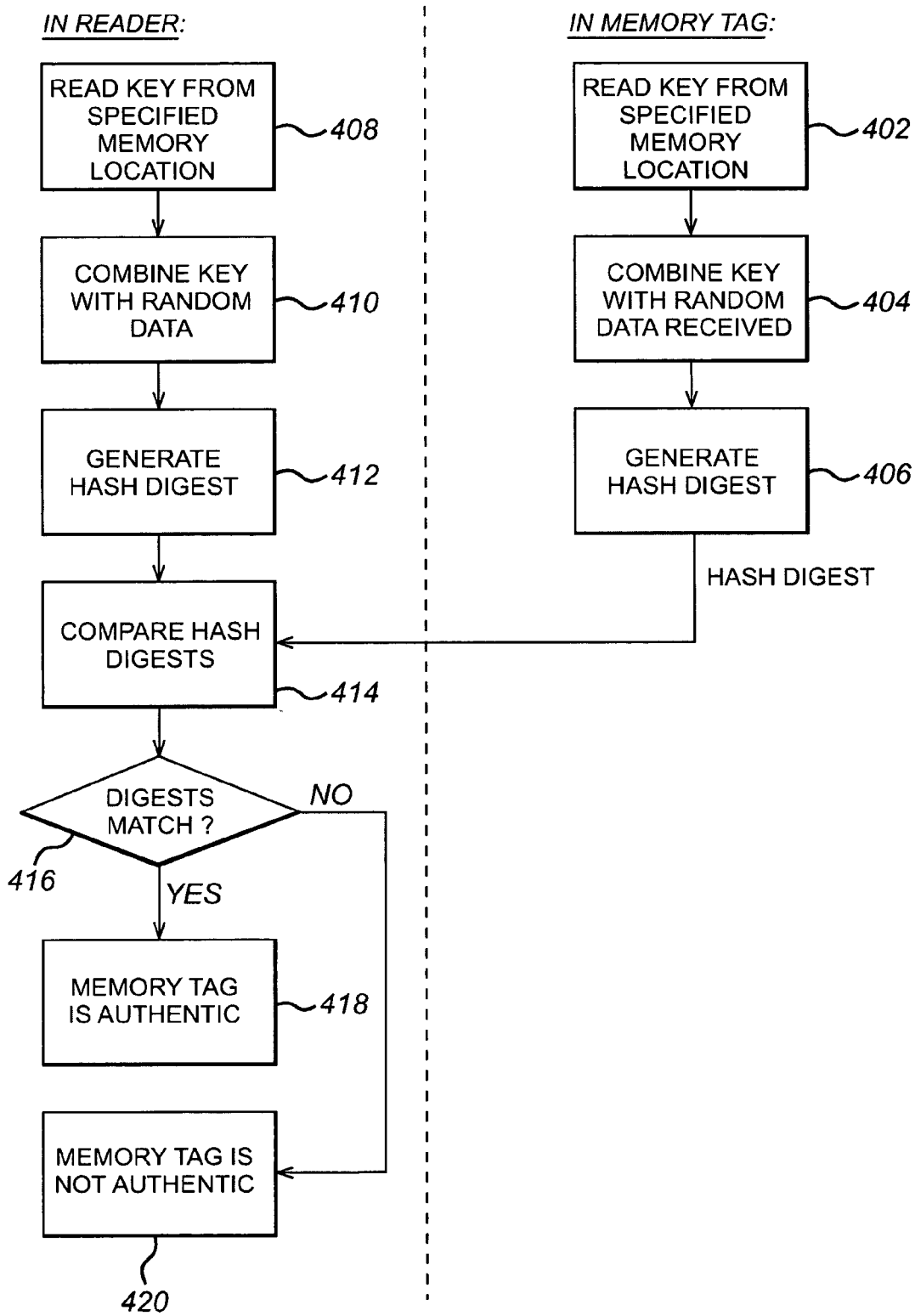
FIG. 2 is a flow diagram depicting the process of authenticating a memory tag according to embodiments of the invention.

Referring to FIG. 2, the process of determining whether a memory tag 100 presented to a memory tag reader 200 is authentic (in the example of the museum access tag given above, determining that the memory tag presented to the reader is a memory tag issued by the museum rather than a copy or clone thereof) is described. As already mentioned, when a memory tag is issued in the museum access example given above, a key sequence which is known only to certain museum personnel is written into the write-only memory area of the memory tag. At the same time, the same key is written into the write-only memory area 204 in each memory reader device 200 that is to be employed to read that tag 100. For the purposes of this example, the key sequence will be represented by the sequence "ABC", but the key sequence may be any combination of letters and/or numbers and/or symbols. This is a secret key sequence known only to the personnel who operate the clean room in the museum and it cannot be read from the write-only memory area 110 in the memory tag 100 other than by the memory tag device processor 104. Similarly, it cannot be read from the write-only memory area 204 in the memory tag reader other than by the memory tag reader device 200 processor. Of course, the key may be used in any number of memory tags 100.

When a patron of the museum arrives at the museum portal and wishes to gain access, the memory tag 100 is presented to the reader 200 on the door, as already discussed. In order to authenticate the tag as a tag issued by the museum, the reader device 200 on the door of the museum sends an authentication data packet, as shown in FIG. 1b(ii), to the memory tag 100. Upon receiving an authentication command, the device processor 104 within the memory tag 100 makes use of the memory controller 106 and accesses the data specified by the key address field 308 in the data packet 300 received from the reader device 200. The device processor 104 therefore reads, in this example, the sequence "ABC" from the write-only memory area 110. This step is set forth in function box 402 of FIG. 2. The memory tag 100 has also received, by way of data field 312 in data packet 300, an amount of random data. This random data is combined with the key sequence "ABC" (function box 404). The key sequence and random data may be combined in any suitable fashion. However, in a preferred embodiment, the key sequence data and random data are interleaved.

At this point it is to be mentioned that the random data is provided to the memory tag 100 from the memory reader 200. The reader device functionality 202 is provided with a random number generator. It is necessary to use random data in order to prevent what is termed "the man in the middle attack". This will be described in more detail below.

The combined key sequence and random data is then passed, in the memory tag 100, under control of the device processor 104 to the hash co-processor 116. The hash co-processor performs a hash function, in the preferred embodiment an optimised SHA1 function, on the data passed to it and produces a hash digest (function box 406). The hash digest is then passed under the control of the device processor 104, via the inductive link, to the memory tag reader 200. As already noted, the hash digest is, in the preferred embodiment, a 160 bit SHA1 digest.

Whilst the above operations are being performed in the memory tag 100, the following steps are carried out within the memory tag reader device 200. The following steps are carried out either under the control of the reader device functionality in one embodiment, or under the control of the device processor and memory controller of the memory tag that is utilised in the memory tag reader device 200 as a co-processor. In the latter scenario, the device processor of the memory tag is operated under the control of the reader device functionality, which includes the reader device processor.

Firstly, the key sequence, in this example "ABC", is read from the write-only memory area 204 in the memory tag reader 200. This sequence is identified by the key address value which is also provided to the memory tag (function box 408). The memory tag reader device 200 also retains within it a copy of the random data which is forwarded to the memory tag 100 in random data field 312 of data packet 300. This random data is combined, in the same way as in the memory tag 100, with the key sequence that has been read from the write-only memory area 204 within the memory tag reader 200 (function box 410). This combination of data is then passed through the hash co-processor 206 within memory tag reader 200, which is identical to that in memory tag 100 and which therefore will provide an identical digest as long as the key stored in the memory tag reader is identical to the key stored in the memory tag 100 (function box 412).

The memory tag reader device 200 and thus the memory tag reader device processor is now in possession of the hash digest produced in the memory tag 100 and the hash digest produced in the memory tag reader 200. These are compared (function box 414, 416) and if they match the memory tag is identified as authentic (function 418). Otherwise, the memory tag is not an authentic tag and may be rejected (function box 420).

As will be appreciated, this process of authentication prevents the copying or cloning of memory tags. The write-only memory area of the memory tag cannot be read by a memory tag reader device, such as device 200, and therefore cannot be written into a second memory tag. Therefore, if a memory tag is cloned, upon carrying out the authentication process described above, the hash digest produced in the memory tag will be different to that produced in the memory tag reader, because the key sequence "ABC" will not be present in the memory tag. This will result in the memory tag being identified as not authentic.

This authentication procedure also prevents the man in the middle attack, as mentioned above. The man in the middle attack is as follows. A device placed between a reader and a tag will read the output of a tag when it is queried by a reader device. Thereafter, every time the tag is read, the "man in the middle" device will send to the reader that first output. That is, the man in the middle looks at the hash digest that is produced by the memory tag and sends it to the reader. Thereafter, whenever the tag is read, the man in the middle returns the same hash digest. If deterministic data is combined with the key sequence it is possible to determine what the key stored in the tag is by looking at various digests sent by the tag. This is not possible if random data is used as in embodiments of the present invention.

In order to make the above process more secure, the global unique identification (GUID) assigned to a memory tag may be read from the ROM area of the tag 100 and combined with the chosen key sequence. This combination may then be passed through a hash co-processor and the digest produced may be stored as the key sequence in the WOM areas in the memory tag and the memory tag reader. Doing this ties the key sequence to the memory tag and therefore gives more security. Again, the combination of the global unique identification and the chosen sequence may be performed in any way, such as interleaving.

It is also possible to authenticate the data that is stored in the random access memory area 114 of a memory tag 100 memory 102. This procedure requires the use of a further key sequence which is also stored in the write-only memory of the memory tag.

As before, the person or institution issuing memory tags chooses a key sequence, which will be "ABC" again in this example. This is stored as the first key value in the write-only memory 110 of a memory tag 100 and also in a write-only memory 204 of a memory tag reader 200 as described above. This sequence is only known to the person/institution issuing the memory tags. Other data, which is readable by the memory tag reader device 200, is stored in the random access memory area 114 in the memory tag 100. In the example of museum access, this may be a number of entries that are permitted to the museum, for example 20. The data stored in the random access memory area 114 is also combined with the first key sequence (in any suitable fashion, but preferably by interleaving) and that combination is then passed through a hash co-processor, either in the memory tag 100 or in the memory tag reader 200, when the key sequences are written. This hash digest is then stored as the second key sequence in the write only memory area 110 of memory tag 100 only.

In order to authenticate that the data stored in the random access memory area 114 of the memory tag 100 is correct, and has not, for example, been tampered with by someone wishing to increase their number of allowed accesses, the following steps are carried out.

When the memory tag is brought into close proximity with the memory tag reader at the museum portal the procedure set forth above is carried out in order to permit interaction between the two devices. The reader device 200 then sends to the memory tag 100 a normal read request in order to read from the random access memory area 114 the data that is stored in it. Upon receipt of this read request, which may for example take the form of a data packet such as that shown in FIG. 1*lb*(i), the memory tag device processor 104 activates the memory controller 106 and reads from the random access memory area 114 the data stored therein, in this example the value "20". That data is then passed, via the inductive link, to the memory tag reader 200 (function box 502). It should be appreciated that the data stored in the random access memory (RAM) area 114 of the memory may be accessed and altered by unauthorized personnel, in this example to increase the permitted number of accesses to the museum. Such behaviour will however be detected, as discussed below.

The reader device 200 then sends to the memory tag 100 a data packet including an authenticate command and the address of the second key sequence along with random data. In response to this, the memory tag 100 reads the second key sequence from the specified memory location in the area of WOM 110 (function box 504) and combines the second key sequence with the random data (function box 506). This combination is carried out in any suitable manner, but again interleaving is preferred.

This data sequence is then passed through the hash co-processor which produces a hash digest, in the preferred embodiment an optimised SHA1 digest of 160 bits in length (function box 508). The hash digest is then passed, via the inductive link and under the control of the memory tag device processor 104, to the tag reader device 200.

Meanwhile, in the memory tag reader 200, the key sequence "ABC" stored in the write-only memory area 204 within the memory tag reader device 200 is read in the same fashion as described above with regard to FIG. 2 (function box 510). This key sequence is combined with the value read from the random access memory area 114 of the memory tag 100 (function box 512). A hash digest of the combination is generated in the reader device. This hash digest is then combined with the random data that was forwarded to the memory tag, which is also forwarded to the relevant module within the reader device functionality 202 (function box 514).

The final combination of data produced in function box 514 is then passed through the hash co-processor 206 in the memory tag reader 200, which operates as described previously to generate a hash digest (function box 516). This hash digest is compared by the memory tag reader device processor with the hash digest received from the memory tag (function 518).

As will now be apparent, the hash digest produced in the memory tag is produced from the combination of the second key value with random data. The hash digest generated in the reader device 200 is generated from a hash digest (generated from the first key value combined with the data stored in the random access memory area 114 of the memory tag) combined with random data in the same manner as in the memory tag before being hashed. As the second key sequence in the memory tag 100 corresponds to the hash digest of the first key sequence combined with the data stored in the random access memory area 114, if the data stored in the random access memory 114 is tampered with, the hash digest generated in the reader will be different to that generated in the memory tag. Hence, if the digests match (function box 520), the data stored in the random access memory area 114 is authentic (function box 522). However, if the digests do not match, the data stored in the random access memory 114 is not authentic, and has therefore been tampered with or the like (function box 524). Hence, the authenticity of any data stored in the area of general access memory (RAM 114) may be assured.

In the example of museum access, therefore, once the data stored in the random access memory area 114 has been authenticated, the portal can allow access to the museum and the reader device 200 can i) write a decremented value into the random access memory area, and ii) generate a hash digest of the new data combined with the first key sequence and write this to the second key sequence location in the write-only memory. One of the permitted entries to the museum is therefore wiped from the memory tag access device. Such a process may be utilised equally in bus/train passes and telephone payment cards for example. It may also be used in payment cards for other services and/or items, for example.

Figure 3:
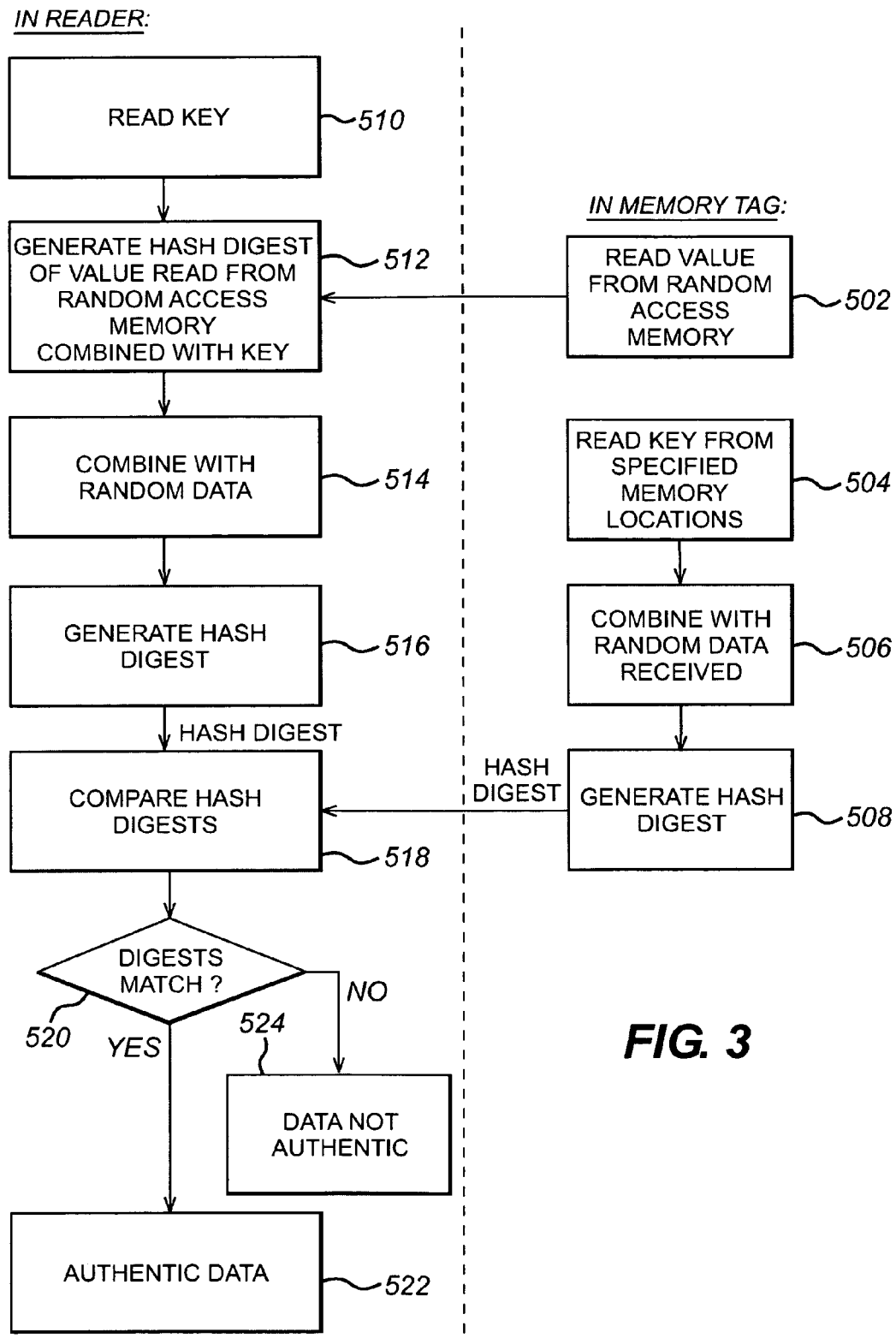
FIG. 3 is a flow diagram depicting the process of authenticating data stored on a memory tag according to embodiments of the invention.

Of course, the process of FIG. 2 and the process of FIG. 3 may be carried out on the same memory tag. Hence, the authenticity of a memory tag may be ascertained utilising a first key sequence and the authenticity of the data stored upon the memory tag may be ascertained utilising the first key sequence, a second key sequence and the data stored in the random access memory area 114. Moreover, more than one key sequence (present in both the memory tag and the reader device areas of WOM) may be combined and then be combined with the random data in either of the above examples, thereby providing greater security.

As will be appreciated, the architecture of embodiments of the present invention enables the authenticity of a memory tag and/or the data stored upon a memory tag to be ascertained. Moreover, the architecture provided enables secure memory tags to be mass-manufactured and to be easily adapted to an institution/person or the like which will issue the tags for use. This invention therefore provides in aspects an easily manufacturable, cheap, secure memory tag architecture and methods of authenticating both the memory tag and the data stored upon it.

It will of course be understood that embodiments of the present invention have been described by way of example only, and that modifications of detail can be made within the scope of the invention.

The invention claimed is:

1. A memory-tag system comprising a memory-tag reader including:
   memory to store a duplicate authentication key, the duplicate authentication key being a duplicate of a device-authentication key stored by a memory tag; and
   a reader processor to,
      issue a read request to the memory tag,
      generate a current data-authentication key based on current data received from the memory tag in response to the read request and the duplicate authentication key,
      issue a data-authentication request to the memory tag, the data-authentication request specifying a random value,
      generate a reader hash digest based on a combination of the current data-authentication key and the random value, and
      determine whether the current data received represents altered or unaltered data based on a comparison of the reader hash digest with a tag hash digest received by the reader in response to the data-authentication request.

2. The memory-tag system as recited in claim 1 further comprising the memory tag, the memory tag including:
   a readable memory location for storing at times original data and the current data;
   a storage location to store the device-authentication key and an original data-authentication key;
   a tag processor to, in response to a write request from an external writer,
      store the original data in the readable memory location, and
      generate the original data-authentication key based on a combination of the original data and the device-authentication key.

3. The memory-tag system as recited in claim 2 wherein the tag processor is further to:
   respond to the read request from the memory-tag reader by providing the current data from the readable memory location to the memory-tag reader; and
   respond to the data-authentication request by generating the tag hash digest from a combination of the original data-authentication key and the random value.

4. A process comprising:
   making, by a memory-tag reader, a read request to a memory tag;
   generating, by the memory-tag reader, a current data-authentication key based on a combination of a duplicate of a device-authentication key stored by the memory tag and current data received from the memory tag in response to the read request;
   generating, by the memory-tag reader, a random value and a reader hash digest, the reader hash digest being generated based on a combination of the current data-authentication key and the random value;
   making, by the memory-tag reader to the memory tag, a data-authentication request including the random value; and
   in response to receiving a tag hash digest from the memory tag, determining whether the current data represents altered data or unaltered data based on a comparison of the tag and reader hash digests.

5. The process as recited in claim 4 further comprising generating, by the memory tag, the tag hash digest based on a combination of original data and an original data-authentication key generated and stored by the memory tag in response to data being written in response to a write request from a second reader device, the original data-authentication key being generated based on a combination of the device-authentication key and the original data.

* * * * *